United States Patent
Saxe et al.

(10) Patent No.: US 11,076,098 B2
(45) Date of Patent: Jul. 27, 2021

(54) PANORAMIC IMAGE CAPTURE FOR MULTISPECTRAL SENSOR

(71) Applicant: VIAVI Solutions Inc., San Jose, CA (US)

(72) Inventors: Steven Saxe, Santa Rosa, CA (US); William D. Houck, Santa Rosa, CA (US)

(73) Assignee: VIAVI Solutions he., San Jose, CA (US)

(*) Notice: Subject to any disclaimer, the term of this patent is extended or adjusted under 35 U.S.C. 154(b) by 0 days.

(21) Appl. No.: 16/784,777

(22) Filed: Feb. 7, 2020

(65) Prior Publication Data

US 2020/0260005 A1    Aug. 13, 2020

Related U.S. Application Data

(60) Provisional application No. 62/804,593, filed on Feb. 12, 2019.

(51) Int. Cl.
*H04N 5/232* (2006.01)
*G06T 7/00* (2017.01)
(Continued)

(52) U.S. Cl.
CPC ....... *H04N 5/23238* (2013.01); *G01N 21/314* (2013.01); *G02B 5/201* (2013.01);
(Continued)

(58) Field of Classification Search
None
See application file for complete search history.

(56) References Cited

U.S. PATENT DOCUMENTS

| 2003/0210228 A1* | 11/2003 | Ebersole | G06F 3/147 345/157 |
| 2012/0300064 A1* | 11/2012 | Mann | G01J 3/513 348/135 |

(Continued)

FOREIGN PATENT DOCUMENTS

WO    2015047864 A2    4/2015

OTHER PUBLICATIONS

Chiu et al., "An improved universal subsampling strategy for compressing mosaic videos with arbitrary RGB color filter arrays in H.264/AVC," Journal of Visual Communication and Image Representation, vol. 25, Issue 7, Oct. 2014, pp. 1791 to 1799.

(Continued)

*Primary Examiner* — James M Anderson, II
(74) *Attorney, Agent, or Firm* — Harrity & Harrity, LLP

(57) ABSTRACT

An image capture device may include a first spectral filter and a second spectral filter arranged so that a panoramic image capture operation captures light filtered by the first spectral filter and light filtered by the second spectral filter in a same region of a combined image and one or more processors to: capture a plurality of images based on the panoramic image capture operation; extract first information and second information from the plurality of images, wherein the first information is associated with the first spectral filter and the second information is associated with the second spectral filter; identify an association between the first information and the second information based on a feature captured in the plurality of images via the first spectral filter and the second spectral filter; and store or provide information based on the association between the first information and the second information.

20 Claims, 7 Drawing Sheets

(51) Int. Cl.
    *H04N 5/225*      (2006.01)
    *H04N 5/265*      (2006.01)
    *G06T 7/30*      (2017.01)
    *G03B 11/00*      (2021.01)
    *G02B 5/20*      (2006.01)
    *G01N 21/31*      (2006.01)

(52) U.S. Cl.
    CPC .............. *G02B 5/208* (2013.01); *G03B 11/00* (2013.01); *G06T 7/30* (2017.01); *G06T 7/97* (2017.01); *H04N 5/2254* (2013.01); *H04N 5/265* (2013.01); *G01N 2021/3155* (2013.01); *G01N 2201/063* (2013.01); *G06T 2207/10036* (2013.01); *G06T 2207/10048* (2013.01); *G06T 2207/20212* (2013.01)

(56) References Cited

U.S. PATENT DOCUMENTS

2013/0265459 A1* 10/2013 Duparre ............... H04N 13/271
                                                                          348/218.1
2016/0011050 A1     1/2016   Skauli
2019/0311534 A1* 10/2019 Shore ..................... G06T 17/05

OTHER PUBLICATIONS

Ren et al., "Low-cost multispectral imaging for remote sensing of lettuce health," Journal of Applied Remote Sensing, vol. 11, Issue 1, Jan. 2017, pp. 016006-1 to 016006-13.
International Search Report and Written Opinion for Application No. PCT/US2020/017541, dated May 15, 2020, 12 pages.

\* cited by examiner

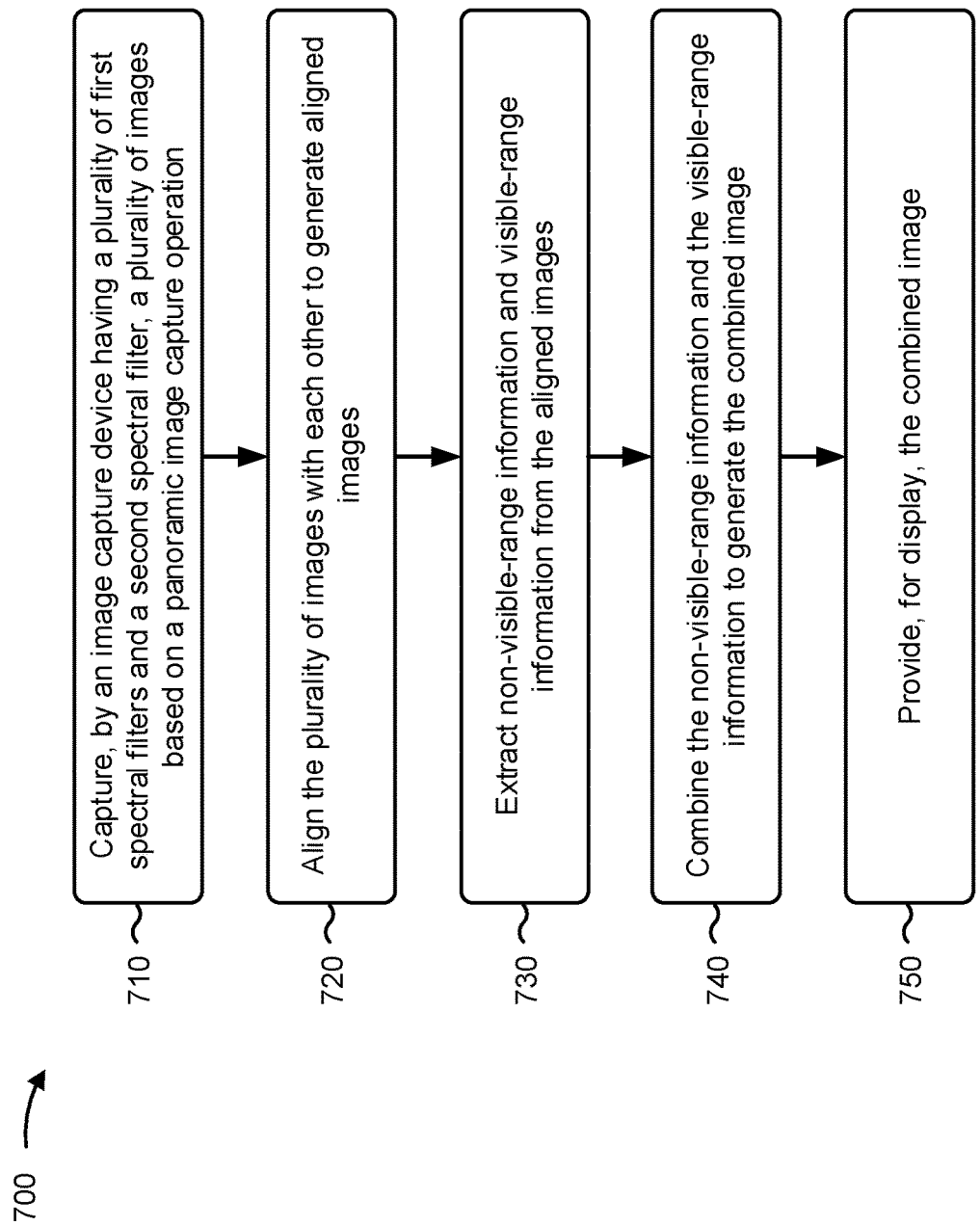

PANORAMIC IMAGE CAPTURE FOR MULTISPECTRAL SENSOR

RELATED APPLICATION

This application claims priority to U.S. Provisional Patent Application No. 62/804,593, filed on Feb. 12, 2019, and entitled "PANORAMIC IMAGE CAPTURE FOR MULTISPECTRAL SENSOR," the content of which is incorporated by reference herein in its entirety.

BACKGROUND

An image capture device may include an image sensor and various components associated with the image sensor, such as a lens, an aperture, a light source, and/or the like. One example of an image capture device is a user device, such as a smartphone, a tablet, and/or the like. An image capture device may provide various image capture modes, such as a portrait mode, a macro mode, a panoramic mode, and/or the like.

SUMMARY

According to some implementations, an image capture device may include: a first spectral filter and a second spectral filter, wherein the first spectral filter and the second spectral filter are arranged so that a panoramic image capture operation captures light filtered by the first spectral filter and light filtered by the second spectral filter in a same region of a combined image; one or more memories; a monolithic image sensor; and one or more processors, communicatively coupled to the one or more memories, to: capture a plurality of images based on the panoramic image capture operation; extract first information and second information from the plurality of images, wherein the first information is associated with the first spectral filter and the second information is associated with the second spectral filter; identify an association between the first information and the second information based on a feature captured in the plurality of images via the first spectral filter and the second spectral filter; and store or provide information based on the association between the first information and the second information.

According to some implementations, a method may include capturing, by an image capture device having a plurality of first spectral filters and a second spectral filter, a plurality of images based on a panoramic image capture operation, wherein the plurality of first spectral filters and the second spectral filter are arranged so that the plurality of images include first image data and second image data, wherein the first image data is for a region of a combined image and is based on the plurality of first spectral filters, and wherein the second image data is for the region of the combined image and is based on the second spectral filter; aligning, by the image capture device, the plurality of images with each other to generate aligned images; extracting, by the image capture device, non-visible-range information and visible-range information from the aligned images, wherein the non-visible-range information is associated with a non-visible spectral range and is based on the first image data, and wherein the visible-range information is associated with a visible spectral range and is based on the second image data; combining, by the image capture device, the non-visible-range information and the visible-range information to generate the combined image; and providing, by the image capture device for display, the combined image.

According to some implementations, an image capture device may include a plurality of first spectral filters and a second spectral filter, wherein the plurality of first spectral filters and the second spectral filter are arranged so that a panoramic image capture operation captures light filtered by the plurality of first spectral filters and light filtered by the second spectral filter with regard to a same subject of the panoramic image capture operation; and an image sensor, wherein the plurality of first spectral filters and the second spectral filter are deposited on or adjacent to the image sensor, and wherein the plurality of first spectral filters are associated with a first region of the image sensor and the second spectral filter is associated with a second region of the image sensor, and wherein the image capture device is capable of performing a snapshot image capture operation via the second spectral filter.

BRIEF DESCRIPTION OF THE DRAWINGS

FIGS. 6 and 7 are flow charts of example processes for multispectral imaging using a panoramic image capture operation.

DETAILED DESCRIPTION

Figure 1:
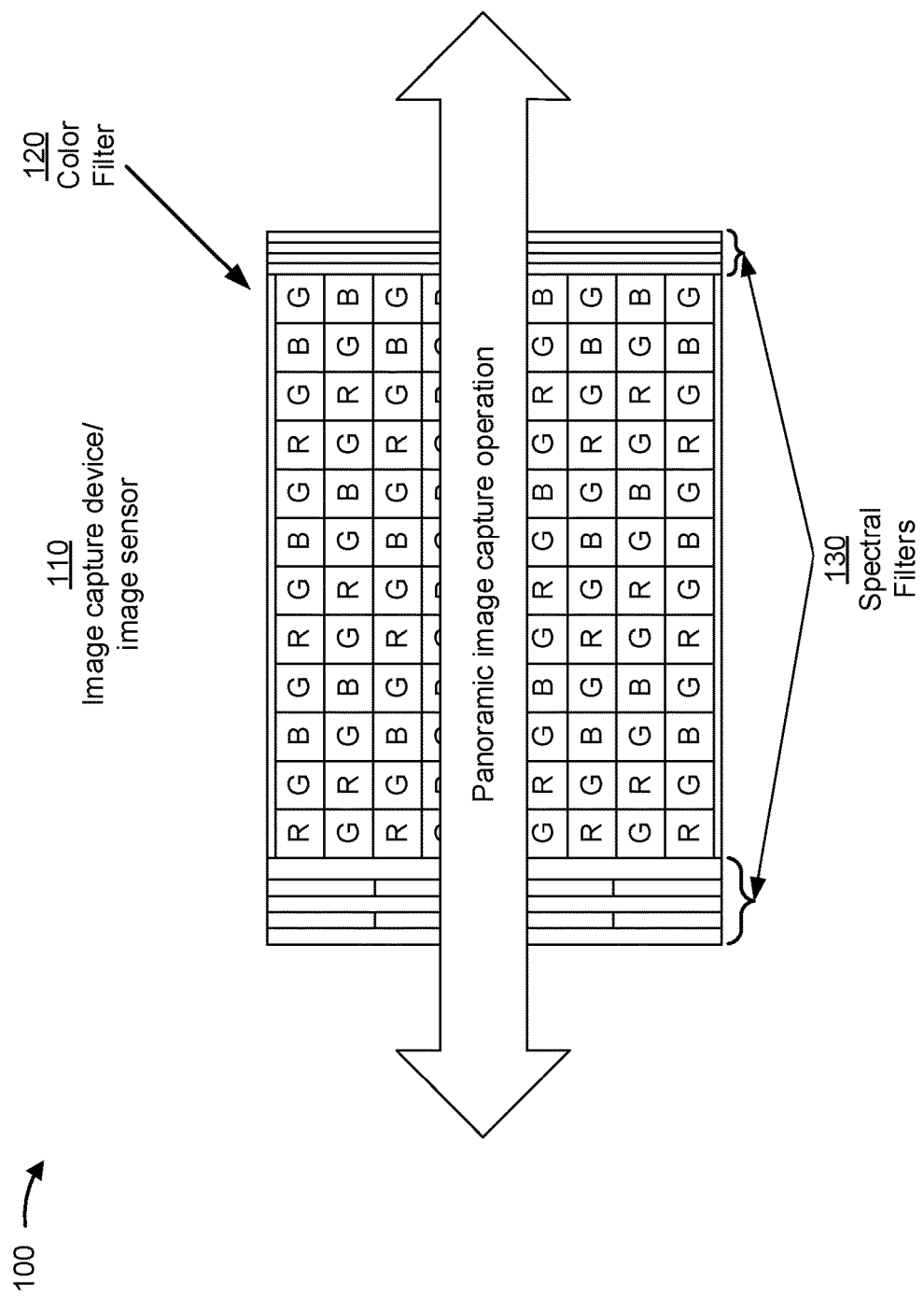
FIG. 1 is a diagram of an example of an image capture device for multispectral imaging using a panoramic image capture operation, as described herein.

The following detailed description of example implementations refers to the accompanying drawings. The same reference numbers in different drawings may identify the same or similar elements.

Multispectral imaging may be used to capture image data within specific wavelength ranges across the electromagnetic spectrum. This image data may be useful for various purposes, such as chemical composition analysis for a material, moisture content determination, vegetation coverage determination, plant health, plant nutrition, human health assessment, and/or the like. In some cases, hyperspectral imaging may be performed, which may use more spectral bands and/or a tighter grouping of spectral bands than multispectral imaging. However, "multispectral" and "hyperspectral" are used interchangeably for the purposes of the implementations described herein.

A user device (e.g., a smartphone, a tablet, and/or the like) may include a camera. The camera may capture images in the visible light range (e.g., for user consumption, for use with applications of the user device, and/or the like) using an image sensor, such as a silicon-based sensor. It may be beneficial to provide multispectral imaging (and/or the analysis of multispectral imaging) via a user device. For example, traditional multispectral imaging devices may be complex, bulky, and expensive, so multispectral imaging via a user device may provide the capabilities associated with multispectral imaging (e.g., chemical composition analysis and/or the like) without the corresponding size and expense, thereby enabling consumer use of multispectral imaging. However, it is challenging to implement a standalone sensor in a user device for multispectral imaging. For example, a standalone sensor (e.g., other than an image sensor associated with a camera of the user device) that is configured to detect non-visual-range light for a multispectral imaging operation is expensive, power-intensive, and bulky.

Some implementations described herein provide multispectral imaging using an image sensor of an image capture device (e.g., a user device, such as a smartphone, a tablet, and/or the like) based on a panoramic image capture operation of the image capture device. For example, the panoramic image capture operation (sometimes referred to as "panoramic mode" or "panorama mode") may generate a combined image using a plurality of images that are captured as the image capture device "sweeps" across a scene. Implementations described herein may provide a set of spectral filters for an image capture device, some of which are for the visible spectrum and some of which are for the non-visible spectrum. The spectral filters for the non-visible spectrum may be provided in a first region as strips, bands, columns, ribbons, rectangles, and/or the like that may be perpendicular to a direction of motion of the panoramic image capture operation. For example, longer axes (e.g., major axes) of the strips, bands, columns, ribbons, rectangles, and/or the like may be perpendicular or substantially perpendicular (e.g., closer to perpendicular than parallel) to a vector defining the direction of motion. The spectral filters for the visible region may be provided in a second region of the image sensor other than the first region. Thus, the plurality of images may include images of a measurement target via one or more visible spectrum filters and via one or more non-visible-spectrum filters. In some cases, a single spectral filter may be referred to herein. It is to be understood that reference to a single spectral filter also contemplates the usage of multiple spectral filters, unless explicitly indicated otherwise. For example, a reference to a spectral filter may be understood to mean "one or more spectral filters."

The image capture device may combine non-visible-spectrum image data of the measurement target and visible-spectrum image data of the measurement target (e.g., using a panoramic imaging technique) so that a combined image that indicates the visible spectrum data and the non-visible spectrum data can be generated. In some implementations, the image capture device may analyze the non-visible-spectrum image data to determine non-visible-spectrum information, such as chemical composition information and/or the like, that can be provided in association with the combined image. Thus, multispectral imaging may be realized using a panoramic image capture operation. For example, the image capture device may achieve multispectral imaging using the panoramic image capture operation while still being capable of capturing snapshot images using the visible-range spectral filter. By performing the multispectral imaging using spectral filters that are swept across the panoramic image as the panoramic image is captured by an image sensor, the cost and size of the multispectral imaging device are reduced in comparison to having a standalone image sensor for multispectral sensing. For example, implementations described herein may reduce the cost, size, weight, and power consumption of the image capture device relative to a standalone image sensor, and may reduce reliance on additional hardware, moving parts, supplemental electronics, and/or the like.

FIG. 1 is a diagram of an example 100 of an image capture device for multispectral imaging using a panoramic image capture operation, as described herein. As shown by reference number 110, example 100 includes an image capture device that is associated with an image sensor. For example, the image capture device may include a user device, and the image sensor may be associated with a camera. In some implementations, the image capture device may be a single camera system. In such a case, the image sensor may be a monolithic image sensor (e.g., using a monolithic silicon chip). In a single camera sensor, a single image sensor (e.g., a monolithic image sensor or another type of image sensor) may be paired with a lens system (e.g., a combination of lens elements along an optical axis).

As shown by reference number 120, example 100 includes a color spectral filter. In some cases, the color spectral filter may be for light in the visible range. In some implementations, the color filter may be a Bayer filter, a red-green-blue (RGB) filter, a visible-range filter in a range of approximately 380 nm to 780 nm, and/or the like. As used herein, visible-range refers to a range of approximately 380 nm to 780 nm. The tiles of the color filter may be arranged in any fashion and the color filter may use any combination of filter tiles. In some implementations, the color spectral filter may be associated with an infrared cut filter (IRCF). The IRCF may filter out infrared wavelengths so that color values of the visible range are not distorted by the infrared wavelengths. In some implementations, the color filter may be associated with a snapshot capability. For example, the image capture device may be capable of capturing a snapshot image via the color filter without performing a panoramic image capture operation. As used herein, "snapshot" may refer to an image that is captured without sweeping the image capture device over a subject of the image, and that has a multiple-pixel width and a multiple-pixel height.

As shown by reference number 130, spectral filters may be provided at edges of the image sensor. Here, a plurality of spectral filters is provided at the left edge of the image sensor, some of which extend partway along the left edge. Furthermore, another set of spectral filters is provided at the right edge of the image sensor. This may mean that both the color spectral filter and the spectral filters shown by reference number 130 are swept over a measurement target during multispectral imaging using a panoramic image capture operation, as described in more detail in connection with FIG. 2. A spectral filter indicated by reference number 130 may correspond to a single pixel width or a multiple-pixel width in the narrow direction. A spectral filter indicated by reference number 130 may extend from a first side of the image sensor to a second side of the image sensor, or may extend partway from the first side to the second side (as shown on the left side of the image capture device). In some implementations, a spectral filter indicated by reference number 130 may be provided in a center portion of the image sensor (e.g., along the edge or elsewhere on the image sensor). In some implementations, a spectral filter indicated by reference number 130 may be arranged along an edge of the image capture device that is perpendicular to a direction of travel for the panoramic image capture operation. In some implementations, a spectral filter shown by reference number 130 may be arranged in a band that is perpendicular to a direction of travel for the panoramic image capture operation.

In some implementations, any number of spectral filters may be provided for the image sensor. For example, a single spectral filter may be provided (e.g., to enable measurement of a single spectral band), or a plurality of spectral filters may be provided (e.g., to enable measurement of a range of spectral bands). In some implementations, the spectral filters indicated by reference number 130 may be for a non-visible spectral band (e.g., a near-infrared band, an ultraviolet band, and/or the like). For example, the spectral filters indicated by reference number 130 may be to pass light in an ultraviolet range or a near-infrared range. In some implementations, the spectral filters indicated by reference number 130 may be associated with a different spectral range than the ultraviolet or near-infrared range, such as a mid-infrared range, an infrared range, a particular part of the visible range, and/or the like.

In some implementations, a spectral filter may be located within the color spectral filter shown by reference number 120 (e.g., rather than at an edge of the image sensor and/or the color spectral filter). For example, one or more pixels in the midst of the color spectral filter may be filtered to receive the non-visible spectral band, which may improve flexibility of multispectral imaging of the image capture device.

In some implementations, the spectral filter shown by reference number 130 (e.g., for the non-visible range) may be a bandpass filter, a blocking filter, a long-wave pass filter, a short-wave pass filter, a dichroic filter, and/or the like. In some implementations, the spectral filter shown by reference number 130 may represent an area that is implemented as the absence of a filter. For example, a near-infrared-blocking filter that overlaps the color spectral filter may not cover the area shown by reference number 130, thus permitting near-infrared light to pass to the image sensor in the area shown by reference number 130. In some implementations, a spectral filter (e.g., shown by reference number 120 or 130) may be provided on or adjacent to (e.g., above, on top of, sandwiched on, and/or the like) the image sensor.

In some implementations, an IRCF is used to block unwanted infrared light from interfering with the color pixel operation of the image sensor, which would otherwise distort color values, as described above. However, the IRCF may impact operation of the spectral filters indicated by reference number 130, since these spectral filters are to pass near-infrared wavelengths. In this case, thin film filters that block unwanted wavelengths (e.g., infrared wavelengths in the color spectral filter region, color wavelengths in the multispectral region, and/or the like) may be used in place of the IRCF. Thus, standard color imaging (e.g., for user consumption) is enabled as well as multispectral imaging using the implementations described herein. In some implementations, a patterned thin-film IRCF may be applied in the region of the color spectral filter shown by reference number 120 prior to deposition of the spectral filters shown by reference number 130. For example, the patterned thin-film IRCF may be non-overlapped with the spectral filters indicated by reference number 130.

In this way, the image capture device may allow a fully transmissive window of all desired wavelengths for color imaging and for multispectral imaging. Furthermore, by using spectral filters in bands or columns at edges of the image sensor, cost, size, and complexity of the multispectral imaging device are reduced.

As indicated above, FIG. 1 is provided merely as one or more examples. Other examples may differ from what is described with regard to FIG. 1.

Figure 2:
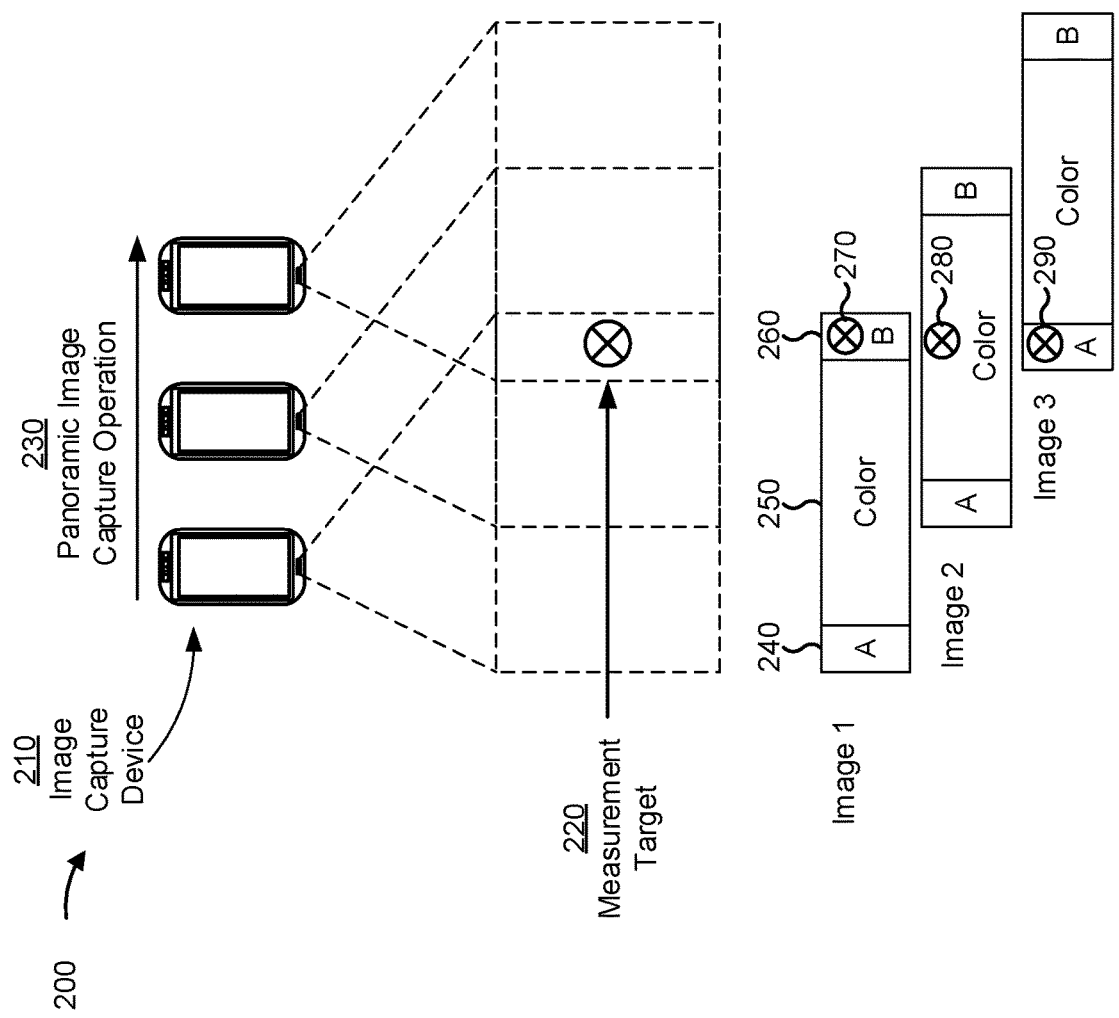
FIG. 2 is a diagram of an example of multispectral imaging using a panoramic image capture operation, as described herein.

FIG. 2 is a diagram of an example 200 of multispectral imaging using a panoramic image capture operation, as described herein. As shown, FIG. 2 includes an image capture device 210 (e.g., an image capture device associated with a camera system, such as a single camera system) and a measurement target 220. The measurement target 220 may correspond to any subject matter for which a multispectral image is to be captured. The measurement target 220 is shown to illustrate how particular regions of a combined image of a panoramic image capture operation can be imaged using visible-range light and non-visible-range light. A direction of travel of the panoramic image capture operation is shown by reference number 230.

Spectral filters of an image sensor of the image capture device 210 are shown by reference numbers 240, 250, and 260. Here, a visible-range spectral filter (e.g., a color filter) is shown by reference number 250, and non-visible-range spectral filters (e.g., a near-infrared filter, an ultraviolet filter, and/or the like) are shown by reference numbers 240 and 260. The non-visible-range spectral filters are referred to as filter A and filter B for clarity. In some implementations, filter A may include multiple, different filters. In some implementations, filter B may include multiple, different filters. In some implementations, only one of filter(s) A or filter(s) B may be included in image capture device 210.

Positions of the measurement target 220 are shown with regard to a plurality of images of the panoramic image capture operation (e.g., Image 1, Image 2, and Image 3). As shown by reference number 270, in Image 1, light from the measurement target 220 is filtered by filter B. Thus, image data regarding the measurement target 220 in Image 1 may represent a spectral range of filter B. As shown by reference number 280, in Image 2, light from the measurement target 220 is filtered by the color filter. Thus, image data regarding the measurement target 220 in Image 2 may represent the visible light range of the color filter. As shown by reference number 290, in Image 3, light from the measurement target 220 is filtered by filter A. Thus, image data regarding the measurement target 220 in Image 3 may represent the spectral range of filter A. In this way, images of the measurement target 220 are captured through each of the filters A, B, and the color filter. The image capture device may combine these images to generate a combined image as part of the panoramic image capture operation, as described in more detail in connection with FIG. 3.

As indicated above, FIG. 2 is provided merely as one or more examples. Other examples may differ from what is described with regard to FIG. 2.

Figure 3:
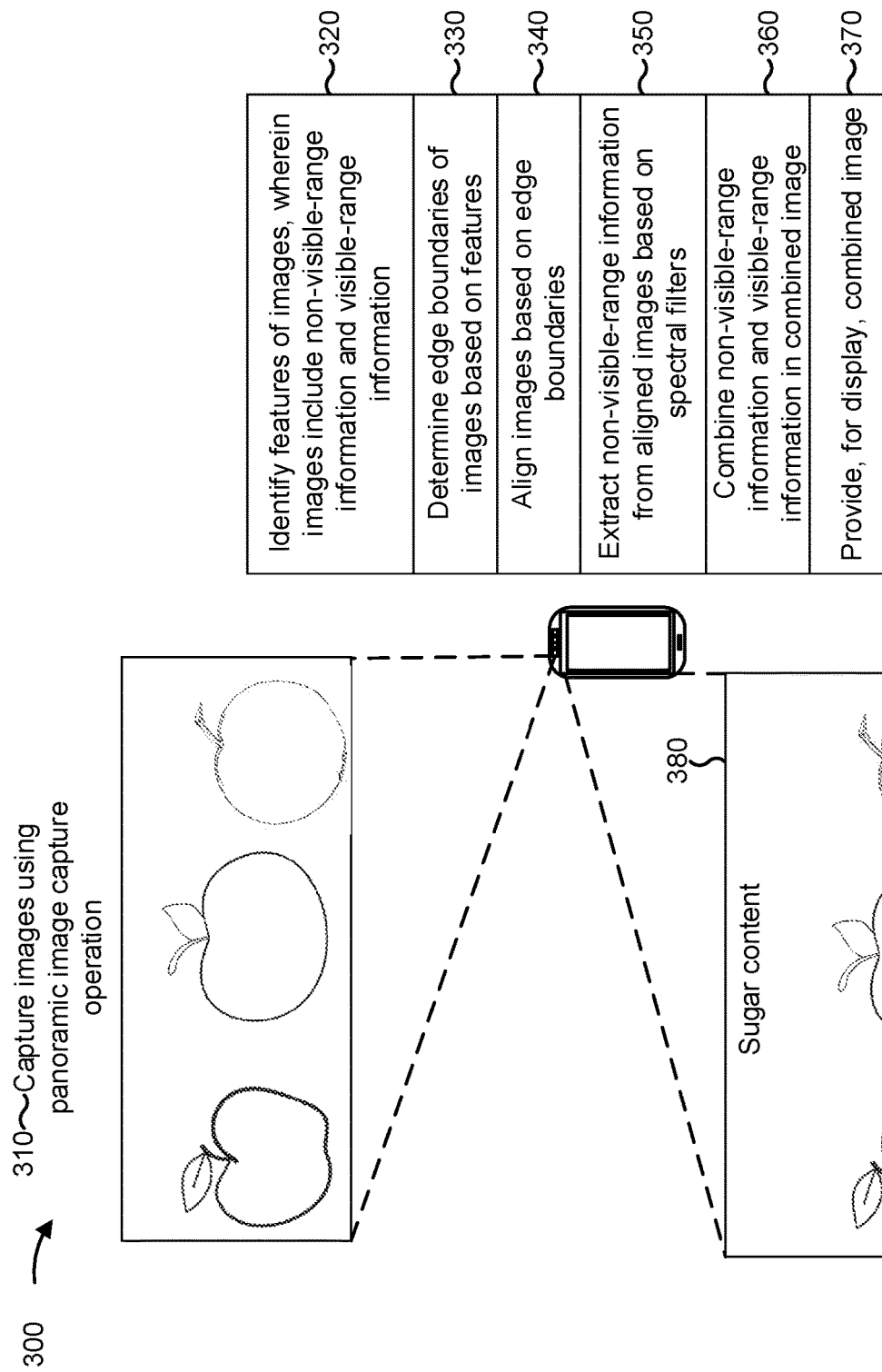
FIG. 3 is a diagram of another example of multispectral imaging using a panoramic image capture operation, as described herein.

FIG. 3 is a diagram of another example 300 of multispectral imaging using a panoramic image capture operation, as described herein. The operations of example 300 may be performed by an image capture device (e.g., image capture device 210). In this example, the image capture device may include the visible-range filter and the non-visible-range filters described in connection with FIGS. 1 and 2, so that multispectral imaging using a panoramic image capture operation can be performed. As shown in FIG. 3, and by reference number 310, the image capture device may capture a plurality of images as part of a panoramic image capture operation. Here, the plurality of images depict fruit. In some implementations, the plurality of images may partially overlap each other, as described in more detail in connection with FIG. 2. For example, the image capture device may capture partially overlapping images so that both visible-range data and non-visible-range data are captured for regions of the images that are overlapped.

As shown by reference number 320, the image capture device may identify features of the plurality of images. For example, the plurality of images may include non-visible-range (e.g., multispectral) image data and visible-range image data. The features may include, for example, a geometric feature, a person, a face, an object, and/or the like. The image capture device may identify the features to enable alignment and combination of the plurality of images so that the non-visible-range image data and the visible-range image data can be combined.

As shown by reference number 330, the image capture device may determine edge boundaries of the plurality of images based on the features. For example, the image capture device may determine where an edge of a first image is to be located in a second image when the first image and the second image are combined to form the combined image. The image capture device may determine the edge boundaries based on the features. For example, the image capture device may identify a particular feature in two images and may identify relative locations of edge boundaries of the two images based on the particular feature. In some implementations, a different approach may be used to determine the edge boundaries and/or combine the images, such as any approach associated with a panoramic image capture technique.

As shown by reference number 340, the image capture device may align the plurality of images with each other based on the features and/or the edge boundaries. For example, the image capture device may determine respective coordinates of particular features in each image of the plurality of images, and may align the plurality of images with each other based on the respective coordinates of the particular features. As another example, the image capture device may determine respective coordinates of edge boundaries of the plurality of images, and may align the plurality of images with each other based on the respective coordinates of the edge boundaries. Thus, the image capture device may enable the combination of visible-range information and non-visible-range information of the plurality of images, as described in more detail below. For example, referring back to Images 1, 2, and 3 of FIG. 2, when Images 1, 2, and 3 are combined, the combined image may include spectral information corresponding to filter A, the color filter, and filter B for the measurement target 220.

In some implementations, the image capture device may extract information from the plurality of images without generating a combined image based on the plurality of images. For example, the image capture device may identify an association between non-visible-range information (e.g., first information) and visible-range information (e.g., second information) based on a feature captured in the plurality of images via the first spectral filter and the second spectral filter. In such a case, the image capture device may store, provide, and/or display information based on the association between the first information and the second information. For example, the image capture device may provide, for display, an image based on the visible-range information, and may provide information that is based on the non-visible-range information corresponding to particular regions of the image. In such a case, the image capture device may receive an interaction with a region of the image that is based on the visible-range information, and may provide non-visible-range information associated with the region (e.g., chemical composition information, a visual representation of a chemical composition of the region of the image, etc.). In this way, the image capture device may conserve processor resources that would otherwise be used to generate the combined image.

In some implementations, the image capture device may identify two or more selected images, of the plurality of images, to be combined to form the combined image. For example, the image capture device may identify the two or more selected images based on an image analysis (e.g., based on clarity, brightness, focus, and/or the like). As another example, the image capture device may identify the two or more selected images based on the edge boundaries of the two or more selected images. For example, the image capture device may identify a subset of images, of the plurality of images, that have sufficient overlap so that a combined image can be formed that includes spectral content from each spectral filter of the image capture device. In some implementations, the image capture device may determine that one or more images, of the plurality of images, are not to be used to form the combined image (e.g., since data of the one or more images is already included in other overlapping images of the plurality of images), and may thereby conserve processing resources that would otherwise be used to combine a larger subset of images that includes the one or more images.

As shown by reference number 350, the image capture device may determine non-visible-range information based on the aligned images and based on the spectral filters. For example, the image capture device may determine the non-visible-range information based on the non-visible-range image data. In some implementations, the image capture device may perform an analysis of the non-visible-range image data to determine the non-visible-range information. For example, the image capture device may determine a chemical composition of a subject matter of the plurality of image based on the non-visible-range image data. In FIG. 3, the image capture device determines sugar content of the fruit shown in the plurality of images.

In some implementations, the image capture device may apply a model to the non-visible-range image data to determine the non-visible-range information. The model may receive, as input, the non-visible-range image data and may output chemical composition information as the non-visible-range information. In some implementations, the model may be trained based on an algorithm, such as a machine learning algorithm and/or the like. For example, the model may be trained using a training set (e.g., a training set, a validation set, and/or a test set) of non-visible-range image data and corresponding chemical compositions. In some implementations, the image capture device may apply the model locally. For example, the image capture device may store the model, and may perform analysis of the non-visible-range image data using the model. In some implementations, the image capture device may provide the non-visible-range image data to another device, and the other device may use the model to perform analysis of the non-visible-range image data. Applying the model locally at the image capture device may reduce latency associated with generating the combined image, which may enable augmented reality applications and/or the like. Applying the model at the server device may conserve battery and/or processor resources of the image capture device, and may enable the application of more sophisticated models than would be feasible or efficient at the image capture device.

As shown by reference number 360, the image capture device may combine the non-visible-range information and the visible-range information in the combined image and, as shown by reference number 370, the image capture device may provide the combined image for display. In some implementations, the image capture device may modify the combined image based on the non-visible-range information. For example, as shown by reference number 380, in this case, the image capture device superimposes an indication of the sugar content of each fruit (e.g., determined based on the chemical composition, which was determined using the non-visible-range information described above). In some implementations, the image capture device may superimpose other information, such as information indicating a ripeness of a fruit or vegetable, a water depth, a vegetation coverage, a food's chemical composition, and/or the like. Here, the superimposed information indicates the sugar content using numbers. However, the superimposed information may take any form, such as a color, a hatching, a label, and/or the like. Thus, a visible-range combined image, which is understandable to a user, may be modified based on non-visible-range information, thereby providing the non-visible-range information in a user-friendly interface and conserving image capture device resources (e.g., processing resources, display resources, battery resources, and/or the like) that would otherwise be used to provide a less intuitive interface or multiple different interfaces for the non-visible-range information.

In some implementations, the image capture device may provide the combined image using an augmented reality technique. For example, the image capture device may superimpose the non-visible-range information on the combined image. In some implementations, the image capture device may modify the combined image based on a user interaction. For example, the image capture device may receive an interaction with a particular part of the combined image, and may provide additional information regarding the particular part. In the example of FIG. 3, if the image capture device receives an interaction with one of the fruits, then the image capture device may provide additional information regarding the chemical composition of the fruit (e.g., a more specific sugar content value, a ripeness, and/or the like). In this way, the image capture device may provide a user interface for drilling down into the non-visible-range information and adjusting the combined image accordingly, thereby conserving processor resources and/or battery that would otherwise be used to capture and generate another combined image to present the adjustment of the combined image.

Thus, multispectral imaging may be realized using a panoramic image capture operation. By performing the multispectral imaging using a spectral filter that is swept across the panoramic image as the panoramic image is captured by an image sensor, the cost and size of the multispectral imaging device is reduced in comparison to having a standalone image sensor for multispectral sensing. For example, implementations described herein may reduce the cost, size, weight, and power consumption of the image capture device relative to a standalone image sensor, and may reduce reliance on additional hardware, moving parts, supplemental electronics, and/or the like.

As indicated above, FIG. 3 is provided merely as one or more examples. Other examples may differ from what is described with regard to FIG. 3.

Figure 4:
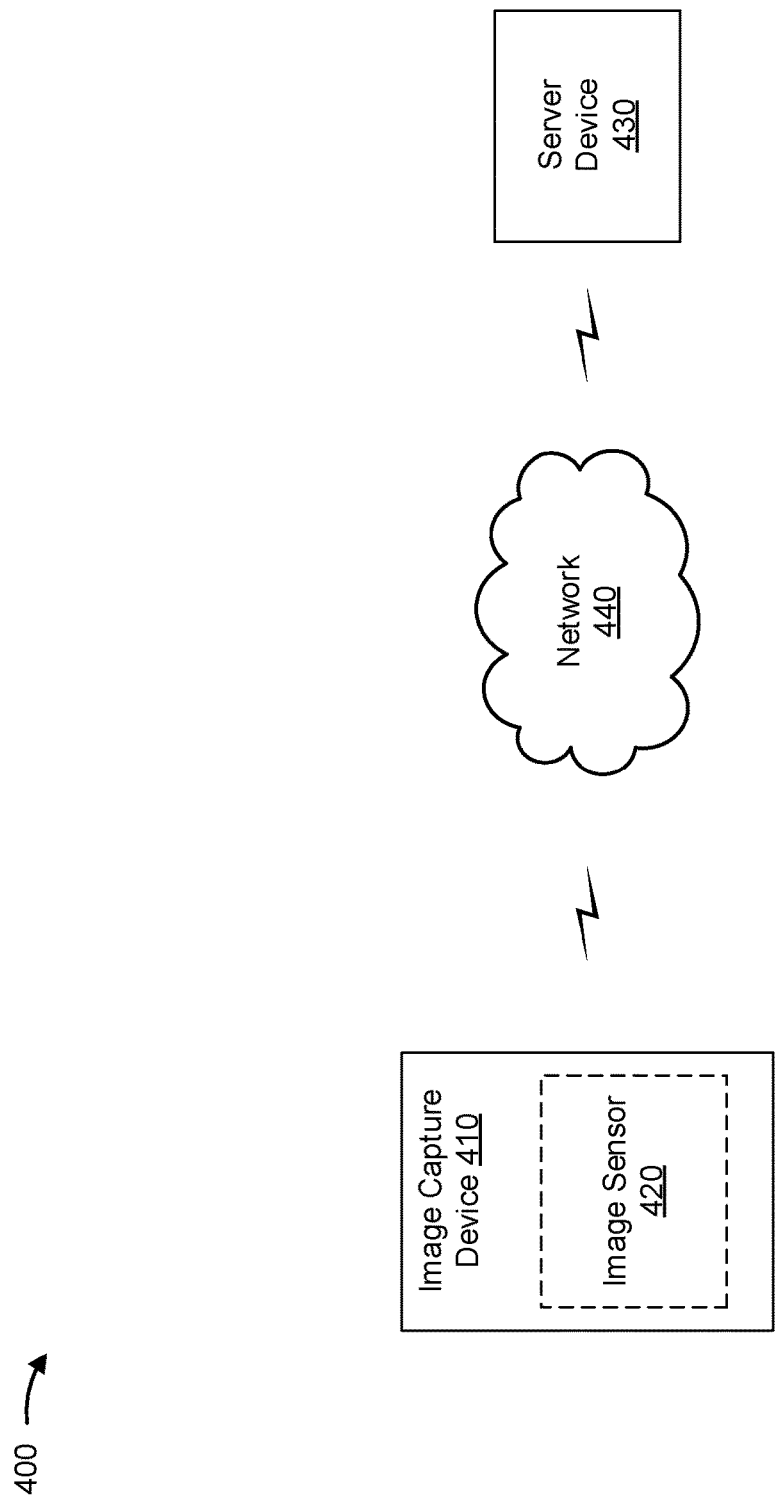
FIG. 4 is a diagram of an example environment in which systems and/or methods described herein may be implemented.

FIG. 4 is a diagram of an example environment 400 in which systems and/or methods, described herein, may be implemented. As shown in FIG. 4, environment 400 may include an image capture device 410 that includes an image sensor 420, a server device 430, and a network 440. Devices of environment 400 may interconnect via wired connections, wireless connections, or a combination of wired and wireless connections.

Image capture device 410 includes one or more devices capable of receiving, generating, storing, processing, and/or providing information associated with a panoramic image capture operation. For example, image capture device 410 may include a communication and/or computing device, such as a smart phone, a tablet computer, a handheld computer, a wearable communication device (e.g., a smart wristwatch, a pair of smart eyeglasses, and/or the like), or a similar type of device. In some implementations, image capture device 410 may be associated with a single camera system, such as including one or more image sensors 420 that are collectively aligned on an optical axis with a lens system.

Image capture device 410 includes an image sensor 420. Image sensor 420 includes a device capable of performing a measurement of light directed toward image sensor 420 (e.g., via one or more spectral filters). For example, image sensor 420 may perform a sensor measurement of light directed toward image sensor 420. Image sensor 420 may utilize one or more sensor technologies, such as a complementary metal-oxide-semiconductor (CMOS) technology, a charge-coupled device (CCD) technology, and/or the like. Image sensor 420 may include multiple sensor elements (e.g., an array of sensor elements—referred to as a sensor array) each configured to obtain information. Some sensor elements may be associated with a visible light range (e.g., and/or a visible-spectrum spectral filter), and other sensor elements may be associated with a non-visible light range (e.g., and/or a non-visible-spectrum spectral filter). In some implementations, image sensor 420 may include a single image sensor such as a monolithic image sensor.

Server device 430 includes one or more devices capable of storing, processing, and/or routing information associated with multispectral imaging using image capture device 410. In some implementations, server device 430 may include a communication interface that allows server device 430 to receive information from and/or transmit information to other devices in environment 400.

Network 440 includes one or more wired and/or wireless networks. For example, network 440 may include a cellular network (e.g., a long-term evolution (LTE) network, a code division multiple access (CDMA) network, a 4G network, a 5G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
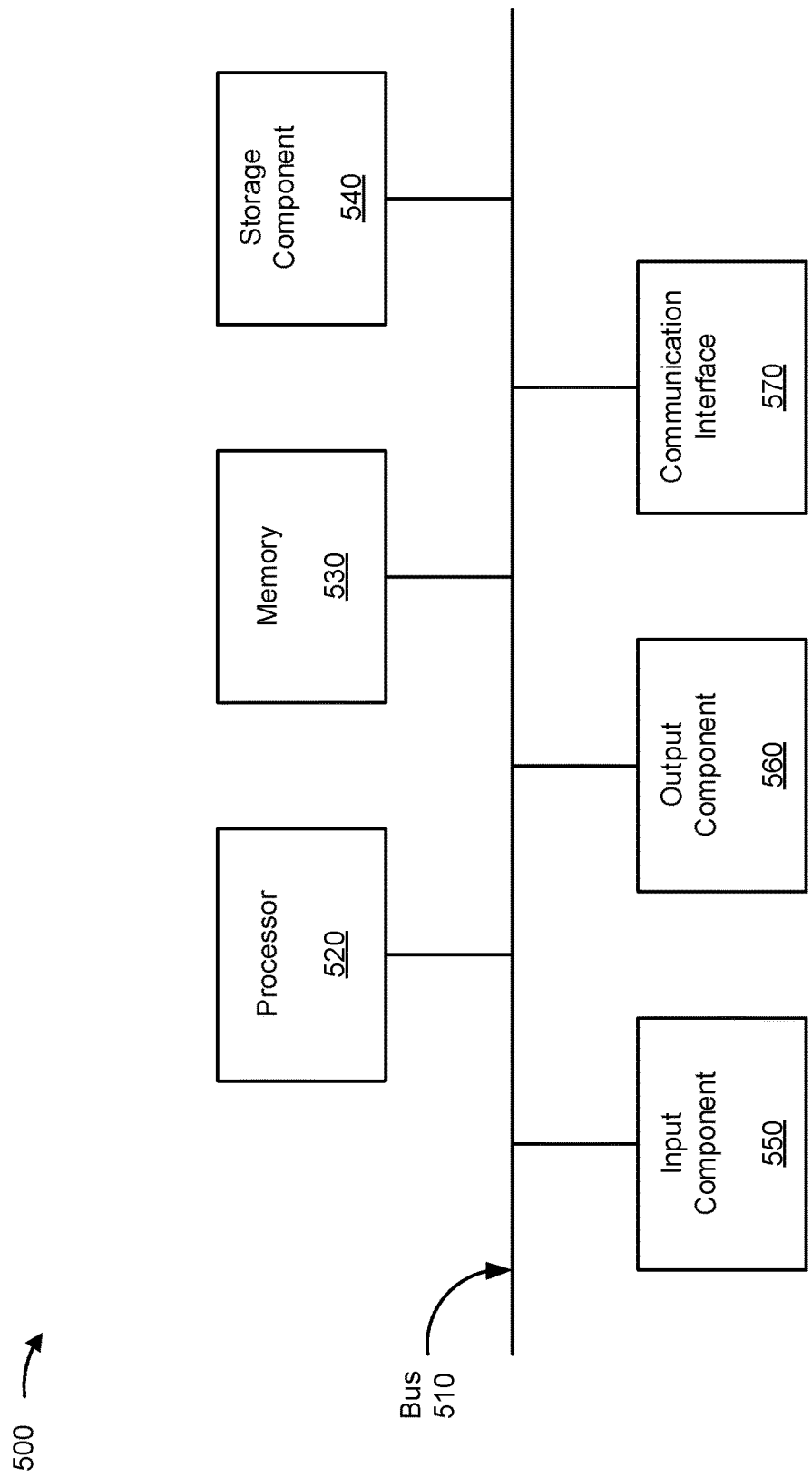
FIG. 5 is a diagram of example components of one or more devices of FIG. 3.

FIG. 5 is a diagram of example components of a device 500. Device 500 may correspond to image capture device 410 and/or server device 430. In some implementations, image capture device 410 and/or server device 430 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
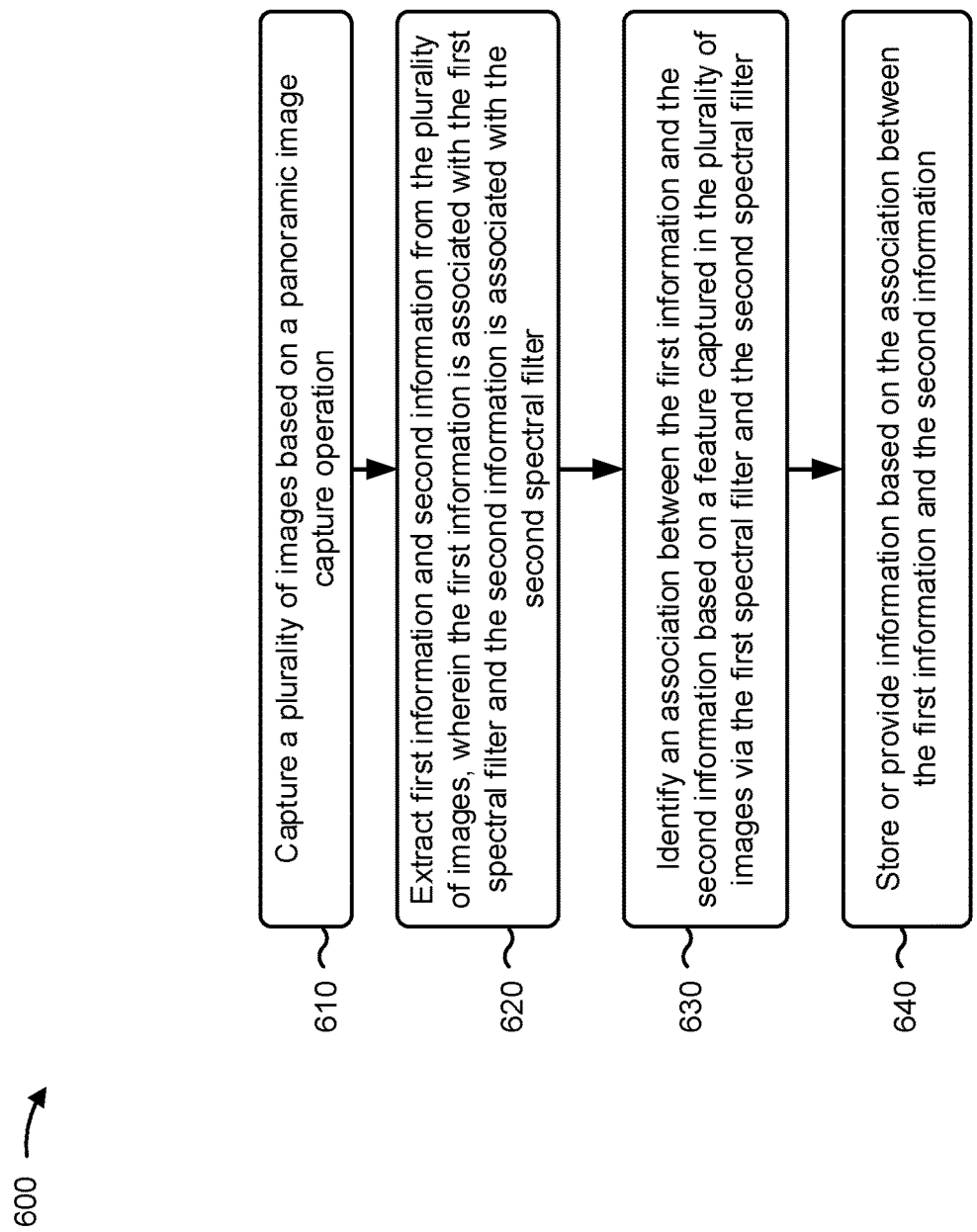

FIG. 6 is a flow chart of an example process 600 multi-spectral imaging using a panoramic image capture operation. In some implementations, one or more process blocks of FIG. 6 may be performed by an image capture device (e.g., image capture device 410). In some implementations, one or more process blocks of FIG. 6 may be performed by another device or a group of devices separate from or including the image capture device, such as an image sensor (e.g., image sensor 420), a server device (e.g., server device 430), and/or the like.

The image capture device may include a first spectral filter and a second spectral filter. The first spectral filter and the second spectral filter may be arranged so that a panoramic image capture operation captures light filtered by the first spectral filter and light filtered by the second spectral filter in a same region of a combined image.

As shown in FIG. 6, process 600 may include capturing a plurality of images based on the panoramic image capture operation (block 610). For example, the image capture device (e.g., using an image sensor 420, a processor 520, a memory 530, a storage component 540, an input component 550, and/or the like) may capture a plurality of images based on the panoramic image capture operation, as described above. In some implementations, the image capture device (e.g., using an image sensor 420, a processor 520, a memory 530, a storage component 540, and/or the like) may identify features of the plurality of images, as described above. In some implementations, the image capture device (e.g., using an image sensor 420, a processor 520, a memory 530, a storage component 540, and/or the like) may align the plurality of images with each other based on the features to generate aligned images, as described above.

As further shown in FIG. 6, process 600 may include extracting first information and second information from the plurality of images, wherein the first information is associated with the first spectral filter and the second information is associated with the second spectral filter (block 620). For example, the image capture device (e.g., using an image sensor 420, a processor 520, a memory 530, a storage component 540, and/or the like) may extract first information (e.g., non-visible-range information) and second information (e.g., visible-range information) from the plurality of images, as described above. In some implementations, the first information is associated with the first spectral filter and the second information is associated with the second spectral filter.

As further shown in FIG. 6, process 600 may include identifying an association between the first information and the second information based on a feature captured in the plurality of images via the first spectral filter and the second spectral filter (block 630). For example, the image capture device (e.g., using an image sensor 420, a processor 520, a memory 530, a storage component 540, and/or the like) may identify an association between the first information and the second information based on a feature captured in the plurality of images via the first spectral filter and the second spectral filter, as described above.

As further shown in FIG. 6, process 600 may include storing or providing information based on the association between the first information and the second information (block 640). For example, the image capture device (e.g., using an image sensor 420, a processor 520, a memory 530, a storage component 540, an input component 550, an output component 560, and a communication interface 570, and/or the like) may store or provide information based on the association between the first information and the second information, as described above.

Process 600 may include additional implementations, such as any single implementation or any combination of implementations described below and/or in connection with one or more other processes described elsewhere herein.

In some implementations, the first spectral filter is arranged along an edge of the image capture device that is perpendicular to a direction of travel for the panoramic image capture operation. In some implementations, the first spectral filter comprises a plurality of spectral filters. In some implementations, the plurality of spectral filters are for multispectral or hyperspectral spectral imaging. In some implementations, the first information is non-visible-range information associated with a non-visible spectral range and the second information is visible-range information associated with a visible spectral range. In some implementations, the image capture device may determine chemical composition information based on the first information; and provide, for display, an indication of the chemical composition information in association with a combined image that is based on the first information and the second information. In some implementations, the image capture device may modify the combined image based on the indication of the chemical composition information. In some implementations, the first spectral filter comprises a bandpass filter or a set of bandpass filters and the second spectral filter comprises a color filter or a set of color filters.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 multispectral imaging using a panoramic image capture operation. In some implementations, one or more process blocks of FIG. 7 may be performed by an image capture device (e.g., image capture device 410). In some implementations, one or more process blocks of FIG. 7 may be performed by another device or a group of devices separate from or including the image capture device, such as an image sensor (e.g., image sensor 420), a server device (e.g., server device 430), and/or the like.

As shown in FIG. 7, process 700 may include capturing, by an image capture device having a plurality of first spectral filters and a second spectral filter, a plurality of images based on a panoramic image capture operation (block 710). For example, the image capture device (e.g., using an image sensor 420, a processor 520, a memory 530, a storage component 540, an input component 550, and/or the like) may capture a plurality of image based on a panoramic image capture operation. The image capture device may have a plurality of first spectral filters and a second spectral filter. The plurality of first spectral filters and the second spectral filter may be arranged so that the plurality of images include first image data and second image data. The first image data may be for a region of a combined image and may be based on the plurality of first spectral filters. The second image data may be for the region of the combined image and may be based on the second spectral filter.

As further shown in FIG. 7, process 700 may include aligning the plurality of images with each other to generate aligned images (block 720). For example, the image capture device (e.g., using an image sensor 420, a processor 520, a memory 530, a storage component 540, and/or the like) may align the plurality of images with each other based on the features to generate aligned images, as described above.

As further shown in FIG. 7, process 700 may include extracting non-visible-range information and visible-range information from the aligned images (block 730). For example, the image capture device (e.g., using an image sensor 420, a processor 520, a memory 530, a storage component 540, and/or the like) may extract non-visible-range information and visible-range information from the aligned images, as described above. In some implementations, the non-visible-range information is associated with a non-visible spectral range and is based on the first image data. In some implementations, the visible-range information is associated with a visible spectral range and is based on the second image data.

As further shown in FIG. 7, process 700 may include combining the non-visible-range information and the visible-range information to generate the combined image (block 740). For example, the image capture device (e.g., using an image sensor 420, a processor 520, a memory 530, a storage component 540, and/or the like) may combine the non-visible-range information and the visible-range information to generate the combined image, as described above.

As further shown in FIG. 7, process 700 may include providing, for display, the combined image (block 750). For example, the image capture device (e.g., using an image sensor 420, a processor 520, a memory 530, a storage component 540, an input component 550, an output component 560, and a communication interface 570, and/or the like) may provide, for display, the combined image, as described above.

Process 700 may include additional implementations, such as any single implementation or any combination of implementations described below and/or in connection with one or more other processes described elsewhere herein.

In some implementations, the plurality of first spectral filters are arranged in bands that are perpendicular to a direction of travel for the panoramic image capture operation. In some implementations, the image capture device may determine chemical composition information based on the non-visible-range information. In some implementations, the image capture device may provide, for display, an indication of the chemical composition information in association with the combined image. In some implementations, the image capture device may provide the indication of the chemical composition information using an augmented reality technique. In some implementations, a first spectral filter, of the plurality of first spectral filters, extends partway along an edge of the image sensor.

In some implementations, the plurality of first spectral filters are associated with respective spectral ranges for multispectral or hyperspectral spectral imaging. In some implementations, the image capture device may align the plurality of images based on respective features or edge boundaries of the plurality of images.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An image capture device, comprising:
   a first spectral filter;
   a second spectral filter,
      wherein the first spectral filter and the second spectral filter are arranged so that a panoramic image capture operation captures light filtered by the first spectral filter and light filtered by the second spectral filter in a same region of a combined image;
   a third spectral filter,
      wherein the first spectral filter and the third spectral filter are non-visible-range spectral filters,
      wherein the second spectral filter is a visible-range spectral filter, and
      wherein the second spectral filter is between the first spectral filter and the third spectral filter;
   one or more memories;
   a monolithic image sensor; and
   one or more processors, communicatively coupled to the one or more memories, to:
      capture, using the monolithic image sensor, a plurality of images based on the panoramic image capture operation;
      extract first information and second information from the plurality of images,
         wherein the first information is associated with the first spectral filter and the second information is associated with the second spectral filter;
      identify an association between the first information and the second information based on a feature captured in the plurality of images via the first spectral filter and the second spectral filter; and
      store or provide information based on the association between the first information and the second information.

2. The image capture device of claim 1, wherein the first spectral filter is arranged along an edge of the image capture device that is perpendicular to a direction of travel for the panoramic image capture operation.

3. The image capture device of claim 1, wherein the non-visible-range spectral filters are for multispectral or hyperspectral spectral imaging.

4. The image capture device of claim 1, wherein the first information is non-visible-range information associated with a non-visible spectral range and the second information is visible-range information associated with a visible spectral range.

5. The image capture device of claim 1, wherein the one or more processors are further to:
   determine chemical composition information based on the first information; and
   wherein the one or more processors, when storing or providing the information based on the association between the first information and the second information, are to:
      provide, for display, an indication of the chemical composition information in association with a combined image that is based on the first information and the second information.

6. The image capture device of claim 5, wherein the one or more processors, when storing or providing the indication of the chemical composition information in association with the combined image, are to:
   modify the combined image based on the indication of the chemical composition information.

7. The image capture device of claim 1, wherein the first spectral filter comprises a bandpass filter or a set of bandpass filters and the second spectral filter comprises a color filter or a set of color filters.

8. A method, comprising:
capturing, by an image capture device having a plurality of first spectral filters and a second spectral filter, a plurality of images based on a panoramic image capture operation,
wherein the plurality of first spectral filters and the second spectral filter are arranged so that the plurality of images include first image data and second image data,
wherein the first image data is for a region of a combined image and is based on the plurality of first spectral filters,
wherein the second image data is for the region of the combined image and is based on the second spectral filter,
wherein the plurality of first spectral filters are non-visible-range spectral filters,
wherein the second spectral filter is a visible-range spectral filter, and
wherein the second spectral filter is between two filters of the plurality of first spectral filters;
aligning, by the image capture device, the plurality of images with each other to generate aligned images;
extracting, by the image capture device, non-visible-range information and visible-range information from the aligned images,
wherein the non-visible-range information is associated with a non-visible spectral range and is based on the first image data, and
wherein the visible-range information is associated with a visible spectral range and is based on the second image data;
combining, by the image capture device, the non-visible-range information and the visible-range information to generate the combined image; and
providing, by the image capture device for display, the combined image.

9. The method of claim 8, wherein the plurality of first spectral filters are arranged in rectangles that are perpendicular to a direction of travel for the panoramic image capture operation.

10. The method of claim 8, further comprising:
determining chemical composition information based on the non-visible-range information; and
wherein providing, for display, the combined image further comprises:
providing, for display, an indication of the chemical composition information in association with the combined image.

11. The method of claim 10, wherein providing, for display, the indication of the chemical composition information in association with the combined image further comprises:
providing the indication of the chemical composition information using an augmented reality technique.

12. The method of claim 8, wherein the plurality of first spectral filters are associated with respective spectral ranges for multispectral or hyperspectral spectral imaging.

13. The method of claim 8, wherein a first spectral filter, of the two filters of the plurality of first spectral filters, extends partway along an edge of an image sensor of the image capture device.

14. An image capture device, comprising:
a plurality of first spectral filters;
a second spectral filter,
wherein the plurality of first spectral filters and the second spectral filter are arranged so that a panoramic image capture operation captures light filtered by the plurality of first spectral filters and light filtered by the second spectral filter with regard to a same subject of the panoramic image capture operation,
wherein the plurality of first spectral filters are non-visible-range spectral filters,
wherein the second spectral filter is a visible-range spectral filter, and
wherein the second spectral filter is between two filters of the plurality of first spectral filters; and
an image sensor,
wherein the plurality of first spectral filters and the second spectral filter are deposited on or adjacent to the image sensor, and
wherein the plurality of first spectral filters are associated with a first region of the image sensor and the second spectral filter is associated with a second region of the image sensor, and
wherein the image capture device is capable of performing a snapshot image capture operation via the second spectral filter.

15. The image capture device of claim 14, wherein the image capture device comprises a user device.

16. The image capture device of claim 14, wherein the plurality of first spectral filters comprise at least one of:
a blocking filter,
a long-wave pass filter,
a short-wave pass filter,
a dichroic filter, or
a bandpass filter.

17. The image capture device of claim 14, wherein the second spectral filter comprises an infrared cut filter (IRCF), and wherein the IRCF is non-overlapped with the plurality of first spectral filters.

18. The image capture device of claim 14, wherein the first region is arranged on one or more columns of pixels along an edge of the image capture device that is perpendicular to a direction of travel for the panoramic image capture operation.

19. The image capture device of claim 14, wherein the plurality of first spectral filters are to pass light in an ultraviolet range or a near-infrared range.

20. The image capture device of claim 1,
wherein the first spectral filter is at a left edge of the monolithic image sensor and extends from a first side of the monolithic image sensor to a second side of the monolithic image sensor, and
wherein the third spectral filter is at a right edge of the monolithic image sensor and extends from the first side of the monolithic image sensor to the second side of the monolithic image sensor.

* * * * *